US012258860B2

(12) United States Patent
Tan et al.

(10) Patent No.: US 12,258,860 B2
(45) Date of Patent: Mar. 25, 2025

(54) METHOD FOR PREDICTING AMOUNT OF WATER-SEALED GAS IN HIGH-SULFUR WATER-BEARING GAS RESERVOIR

(71) Applicant: SOUTHWEST PETROLEUM UNIVERSITY, Chengdu (CN)

(72) Inventors: Xiaohua Tan, Chengdu (CN); Jiajia Shi, Chengdu (CN); Heng Xiao, Chengdu (CN); Yilong Li, Chengdu (CN); Honglin Lu, Chengdu (CN); Jin Fang, Chengdu (CN); Xian Peng, Chengdu (CN); Desheng Jiang, Chengdu (CN); Qian Li, Chengdu (CN); Dong Hui, Chengdu (CN); Qilin Liu, Chengdu (CN); Tao Li, Chengdu (CN); Hang Zhang, Chengdu (CN); Lu Liu, Chengdu (CN); Shilin Huang, Chengdu (CN); Haoran Hu, Chengdu (CN); Yuchuan Zhu, Chengdu (CN); Guowei Zhan, Chengdu (CN); Lin Chen, Chengdu (CN); Yang Qing, Chengdu (CN); Fu Hou, Chengdu (CN); Jian Cao, Chengdu (CN); Xucheng Li, Chengdu (CN); Songcen Li, Chengdu (CN); Lin Yuan, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 325 days.

(21) Appl. No.: 17/956,307

(22) Filed: Sep. 29, 2022

(65) Prior Publication Data
US 2023/0417138 A1 Dec. 28, 2023

(30) Foreign Application Priority Data
Jun. 13, 2022 (CN) .......................... 202210659160.1

(51) Int. Cl.
*E21B 49/08* (2006.01)
*E21B 49/00* (2006.01)
*G06Q 50/02* (2024.01)

(52) U.S. Cl.
CPC .......... *E21B 49/0875* (2020.05); *E21B 49/00* (2013.01); *G06Q 50/02* (2013.01); *E21B 2200/20* (2020.05); *Y02A 10/40* (2018.01)

(58) Field of Classification Search
CPC .. E21B 49/0875; E21B 2200/20; E21B 49/00; Y02A 10/40; G06Q 10/04; G06Q 50/02
See application file for complete search history.

(56) References Cited

U.S. PATENT DOCUMENTS

| 5,974,899 | A | * | 11/1999 | Hanks | ...................... G01N 1/34 73/866 |
| 2019/0368997 | A1 | * | 12/2019 | Chen | ...................... G01N 33/24 |
| 2022/0155275 | A1 | * | 5/2022 | Zuo | ...................... G01N 33/2823 |

* cited by examiner

*Primary Examiner* — Farhana A Hoque
*Assistant Examiner* — Joseph O Nyamogo

(57) ABSTRACT

The present disclosure relates to a method for predicting an amount of water-sealed gas in a high-sulfur water-bearing gas reservoir. The method solves the problem that no method has yet been proposed for predicting the amount of water-sealed gas in a high-sulfur water-bearing gas reservoir. According to the technical solution, the method includes: considering that the volume of the gas reservoir does not change during the production of the constant-volume gas reservoir, deriving, based on a material balance method, a material balance equation of the high-sulfur water-bearing gas reservoir in consideration of water-sealed gas and water-soluble gas, solving and drawing a chart of water-sealed gas in the high-sulfur water-bearing gas reservoir by an iterative algorithm, obtaining a recovery factor of the high-sulfur water-bearing gas reservoir in consideration of water-sealed gas and water-soluble gas, and further obtaining the amount (Continued)

of water-seal gas in the high-sulfur water-bearing gas reservoir.

3 Claims, 3 Drawing Sheets

METHOD FOR PREDICTING AMOUNT OF WATER-SEALED GAS IN HIGH-SULFUR WATER-BEARING GAS RESERVOIR

CROSS REFERENCE TO RELATED APPLICATION

This patent application claims the benefit and priority of Chinese Patent Application No. 202210659160.1, filed on Jun. 13, 2022, the disclosure of which is incorporated by reference herein in its entirety as part of the present application.

TECHNICAL FIELD

The present disclosure relates to a method for predicting an amount of water-sealed gas in a high-sulfur water-bearing gas reservoir.

BACKGROUND ART

During the development of water drive gas reservoirs, because of the heterogeneity of formations, gas in a low permeability zone is susceptible to the block from water in a high permeability zone, which thus leads to water-sealed gas. At present, methods or optimizations for calculating an amount of water-sealed gas are all proposed specific to conventional water-bearing gas reservoirs. As such, no method has yet been proposed for predicting the amount of water-sealed gas in a high-sulfur water-bearing gas reservoir.

SUMMARY

An objective of the present disclosure is to solve the problem that no method has yet been proposed for predicting an amount of water-sealed gas in a high-sulfur water-bearing gas reservoir. According to the present disclosure, based on a material balance method, a material balance equation of the high-sulfur water-bearing gas reservoir in consideration of water-sealed gas and water-soluble gas is derived, and a chart of water-sealed gas in the high-sulfur water-bearing gas reservoir is drawn by applying an iterative algorithm, such that the amount of water-sealed gas is calculated.

In order to achieve the above objective, the present disclosure provides a method for predicting the amount of water-sealed gas in a high-sulfur water-bearing gas reservoir, including the following steps:

S100, deriving a material balance equation of the high-sulfur water-bearing gas reservoir in consideration of water-sealed gas and water-soluble gas, which mainly includes:

S101, establishing a physical model of the high-sulfur water-bearing gas reservoir in consideration of water-sealed gas and water-soluble gas;

S102, for a constant-volume gas reservoir in which a sum of a volume of initial gas and a volume of initial formation water is equal to a sum of a volume of remaining gas, an evolution volume of water soluble gas, a volume of irreducible water, a rock expansion volume, and a volume of remaining formation water, establishing the material balance equation; and S103, substituting each of the volume of remaining gas, the evolution volume of water soluble gas, the volume of irreducible water, the rock expansion volume, and the volume of remaining formation water in S102 into the material balance formula for representation, where the material balance equation of the high-sulfur water-bearing gas reservoir in consideration of water-sealed gas and water-soluble gas is given as follows:

$$\varphi = \frac{1 - R - \delta R^F}{1 + \beta + (\alpha - 1)R^F},$$

where $\delta = \frac{K^+}{V^+ K^+ + 1}$, $\alpha = r_s B_g$, $r_s = \frac{8.314 Z_s \rho_w m_{H_2S} T}{p}$, $$\beta = \frac{B_g S_{wi}}{S_{gi}} \left( \frac{B_w}{B_{wi}} r_s - r_{si} \right) - \frac{(C_f + C_w S_{wi})(p_i - p)}{S_{gi}},$$

and δ denotes a reservoir heterogeneity coefficient; φ denotes a dimensionless pseudopressure; R denotes a dimensionless recovery percent of a gas reservoir; F denotes a dimensionless water invasion constant; $K^+$ denotes a dimensionless permeability ratio; $V^+$ denotes a dimensionless volume ratio; $p_i$ denotes an initial formation pressure of the gas reservoir, in unit of MPa; p denotes a current formation pressure of the gas reservoir, in unit of MPa; $B_g$ denotes a dimensionless volume coefficient of natural gas under a pressure p; $S_{wi}$ denotes a dimensionless initial formation water saturation; $S_{gi}$ denotes a dimensionless initial gas saturation; $B_w$ denotes a dimensionless volume coefficient of formation water under a pressure p; $B_{wi}$ denotes a dimensionless volume coefficient of formation water under a pressure $p_i$; $r_{si}$ denotes a solution gas-water ratio of hydrogen sulfide under a pressure p, in unit of $m^3/m^3$; $r_{si}$ denotes a solution gas-water ratio of hydrogen sulfide under a pressure $p_i$, in unit of $m^3/m^3$, $C_f$ denotes a compressibility coefficient of rock, in unit of $MPa^{-1}$; $C_w$ denotes a compressibility coefficient of formation water, in unit of $MPa^{-1}$; $Z_s$ denotes a dimensionless deviation factor of hydrogen sulfide; $\rho_w$ denotes density of water, in unit of $kg/m^3$; $m_{H_2S}$ denotes solubility of hydrogen sulfide, in unit of mol/kg; and T denotes a temperature of the gas reservoir, in unit of K;

S200, drawing a chart of water-sealed gas in the high-sulfur water-bearing gas reservoir by conducting iterative operation in the material balance equation of the high-sulfur water-bearing gas reservoir in consideration of water-sealed gas and water-soluble gas; and S300, calculating the amount of the water-sealed gas in the high-sulfur water-bearing gas reservoir, which specifically includes:

S301, taking R corresponding to φ=0 as a recovery factor EUR of the high-sulfur water-bearing gas reservoir in consideration of water-sealed gas and water-soluble gas; and S302, setting $G_B = (1-EUR) \times G$;

where G denotes dynamic reserves, in unit of $10^8$ $m^3$; $G_B$ denotes an amount of water-sealed gas, in unit of $10^8$ $m^3$; and EUR denotes a dimensionless recovery ration when φ=0.

The iterative operation in S200 specifically includes the following substeps:

S201, setting $p_0 = p_i$;

S202, assigning 0 as an initial value to R;

S203, substituting $p_0$ into a calculation equation of β and α to obtain β and α, and substituting the obtained β and α, the reservoir heterogeneity coefficient δ, and water invasion constant F into the material balance equation of the high-sulfur water-bearing gas reservoir in consideration of water-sealed gas and water-soluble gas to calculate φ;

S204, calculating the pressure $p_1$ according to $\varphi$, and substituting $p_1$ into the calculation equation of $\beta$ and $\alpha$ to obtain $\beta_1$ and $\alpha_1$;

S205, substituting $\beta_1$ and $\alpha_1$ obtained from $p_1$, as well as given $\delta$ into the material balance equation of the high-sulfur water-bearing gas reservoir in consideration of water-sealed gas and water-soluble gas to calculate $\varphi_1$;

S206, calculating $p_2$ according to $\varphi_1$, and making $p_2$ equal to $p_0$;

S207, repeating S203 to S206 till $p_2-p_1<0.0001$;

S208, outputting $\varphi$ at this moment;

S209, adding 0.05 to R, and repeating S203 to S208 till R is equal to 1, or $p_1$ is smaller than 0; and S210, drawing the chart of water-sealed gas in the high-sulfur water-bearing gas reservoir according to R and corresponding $\varphi$.

According to the method for predicting an amount of water-sealed gas in a high-sulfur water-bearing gas reservoir, the solubility of hydrogen sulfide is measured by an experiment or calculated by an empirical equation.

Compared with the prior art, the present disclosure has the following beneficial effects: (1) the method for predicting an amount of water-sealed gas in a high-sulfur water-bearing gas reservoir is established, which is suitable for the high-sulfur water-bearing gas reservoir; (2) calculation is conducted using the iterative method, thereby ensuring high precision; (3) the chart is drawn by programming, and the calculation process is simple; and (4) the popularity is high.

DETAILED DESCRIPTION OF THE EMBODIMENTS

The present disclosure is further described below with reference to the accompanying drawings and embodiments.

Figure 4:
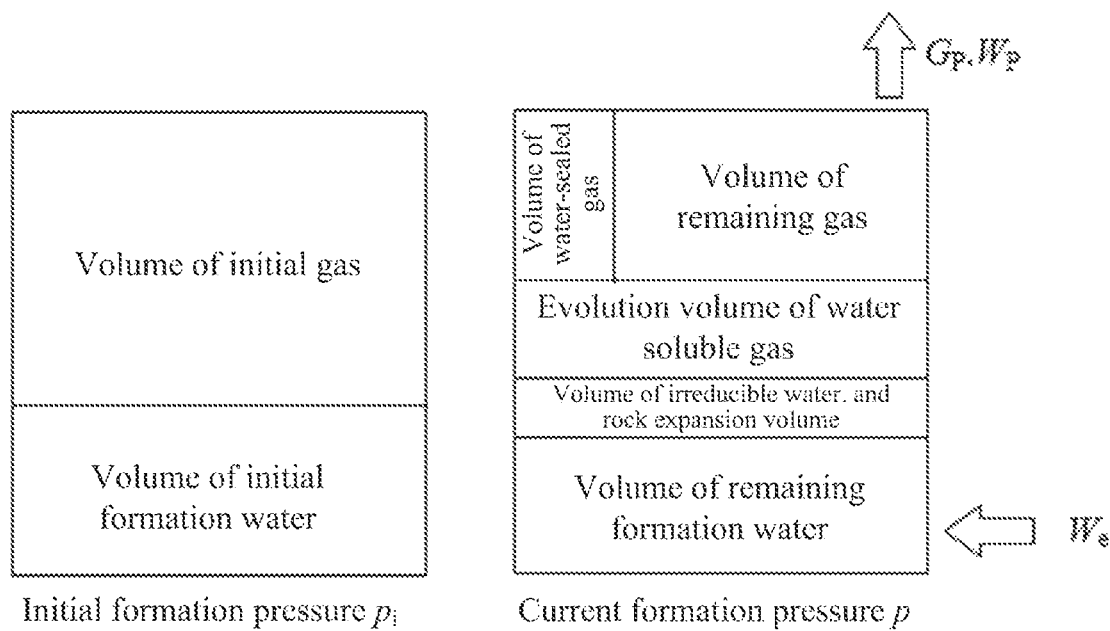
FIG. 4 shows a physical model of the high-sulfur water-bearing gas reservoir in consideration of water-sealed gas and water-soluble gas.

The present disclosure provides a method for predicting the amount of water-sealed gas in a high-sulfur water-bearing gas reservoir, including the following steps:

S100, derive a material balance equation of the high-sulfur water-bearing gas reservoir in consideration of water-sealed gas and water-soluble gas, which mainly includes:

S101, establishing a physical model of the high-sulfur water-bearing gas reservoir in consideration of water-sealed gas and water-soluble gas, as shown in FIG. 4;

S102, for a constant-volume gas reservoir in which a sum of a volume of initial gas and a volume of initial formation water is equal to a sum of a volume of remaining gas, an evolution volume of water soluble gas, a volume of irreducible water, a rock expansion volume, and a volume of remaining formation water, establishing the material balance equation; and S103, substituting each of the volume of remaining gas, the evolution volume of water soluble gas, the volume of irreducible water, the rock expansion volume, and the volume of remaining formation water in S102 into the material balance formula for representation, where the material balance equation of the high-sulfur water-bearing gas reservoir in consideration of water-sealed gas and water-soluble gas is given as follows:

$$\varphi = \frac{1-R-\delta R^F}{1+\beta+(\alpha-1)R^F},$$

$$\text{, where } \delta = \frac{K^+}{V^+K^++1}, \alpha = r_s B_g, r_s = \frac{8.314 Z_s \rho_w m_{H_2S} T}{p},$$

$$\beta = \frac{B_g S_{wi}}{S_{gi}}\left(\frac{B_w}{B_{wi}}r_s - r_{si}\right) - \frac{(C_f+C_w S_{wi})(p_i-p)}{S_{gi}},$$

and $\delta$ denotes a reservoir heterogeneity coefficient; $\varphi$ denotes a dimensionless pseudopressure; R denotes a dimensionless recovery percent of a gas reservoir; F denotes a dimensionless water invasion constant; $K^+$ denotes a dimensionless permeability ratio; $V^+$ denotes a dimensionless volume ratio; $p_i$ denotes an initial formation pressure of the gas reservoir, in unit of MPa; p denotes a current formation pressure of the gas reservoir, in unit of MPa; $B_g$ denotes a dimensionless volume coefficient of natural gas under a pressure p; $S_{wi}$ denotes a dimensionless initial formation water saturation; $S_{gi}$ denotes a dimensionless initial gas saturation; $B_w$ denotes a dimensionless volume coefficient of formation water under a pressure p; $B_{wi}$ denotes a dimensionless volume coefficient of formation water under a pressure $p_i$; $r_s$ denotes a solution gas-water ratio of hydrogen sulfide under a pressure p, in unit of m³/m³; $r_{si}$ denotes a solution gas-water ratio of hydrogen sulfide under a pressure $p_i$, in unit of m³/m³, $C_f$ denotes a compressibility coefficient of rock, in unit of MPa⁻¹; $C_w$ denotes a compressibility coefficient of formation water, in unit of MPa⁻¹; $Z_s$ denotes a dimensionless deviation factor of hydrogen sulfide; p denotes density of water, in unit of kg/m³; $m_{H_2S}$ denotes solubility of hydrogen sulfide, in unit of mol/kg; and T denotes a temperature of the gas reservoir, in unit of K;

For well A of gas field A, the water invasion constant F is 1.5, the dimensionless volume ratio $V^+$ is 0.8, the dimensionless permeability ratio $K^+$ is 1,000, the reservoir heterogeneity coefficient $\delta$ is 1.23, G=1.27×10⁻⁸ m³, $p_i$=40 MPa, $S_{wi}$=0.25, $B_w/B_{wi} \approx 1$, $C_f$=10.88×10⁻⁴ MPa⁻¹, $C_w$=4.6× 10⁻⁴ MPa⁻¹, and T=377.5K.

Figure 1:
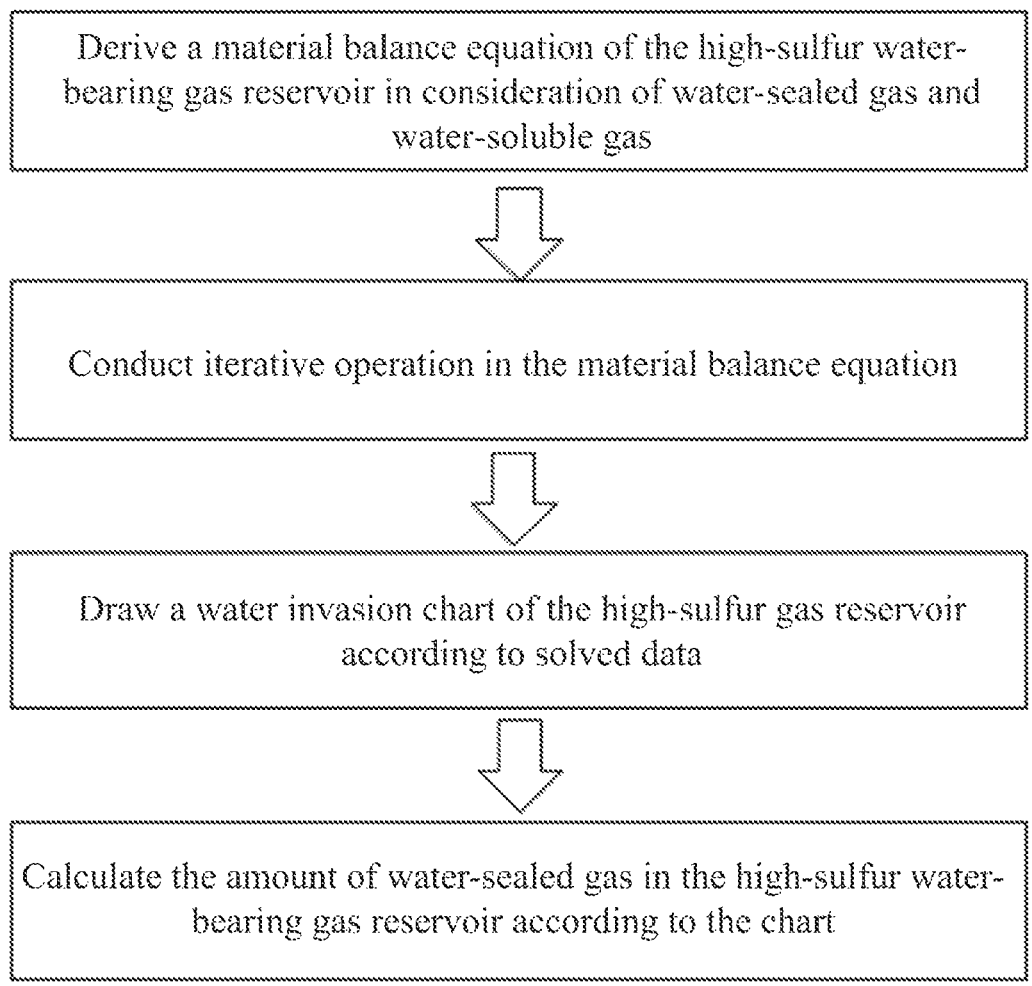
FIG. 1 is a technical route of a method according to the present disclosure.
Figure 2:
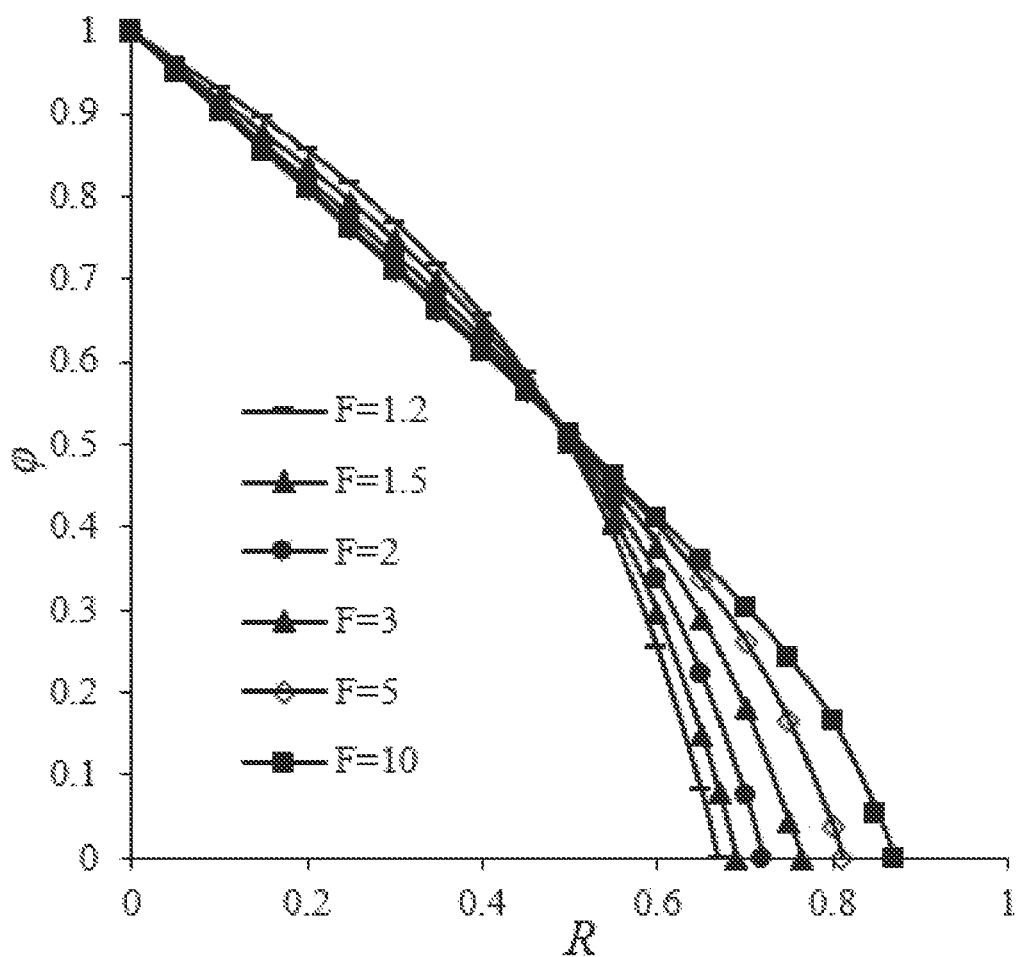
FIG. 2 is a chart of water-sealed gas in the high-sulfur water-bearing gas reservoir.

S200, with reference to the data about the well A of gas field A, draw a chart of water-sealed gas in the high-sulfur water-bearing gas reservoir by conducting iterative operation in the material balance equation of the high-sulfur water-bearing gas reservoir in consideration of water-sealed gas and water-soluble gas, as shown in FIG. 2, which specifically includes:

S201, setting $p_0=p_i$;

S202, assigning 0 as an initial value to R;

S203, substituting $p_0$ into a calculation equation of $\beta$ and $\alpha$ to obtain $\beta$ and $\alpha$, and substituting the obtained $\beta$ and $\alpha$, the reservoir heterogeneity coefficient $\delta$, and water invasion constant F into the material balance equation of the high-sulfur water-bearing gas reservoir in consideration of water-sealed gas and water-soluble gas to calculate $\varphi$;

S204, calculating the pressure $p_1$ according to $\varphi$, and substituting $p_1$ into the calculation equation of $\beta$ and $\alpha$ to obtain $\beta_1$ and $\alpha_1$;

S205, substituting $\beta_1$ and $\alpha_1$ obtained from $p_1$, as well as given $\delta$ into the material balance equation of the high-sulfur water-bearing gas reservoir in consideration of water-sealed gas and water-soluble gas to calculate $\varphi_1$;

S206, calculating $p_2$ according to $\varphi_1$, and making $p_2$ equal to $p_0$;

S207, repeating S203 to S206 till $p_2-p_1<0.0001$;

S208, outputting $\varphi$ at this moment;

S209, adding 0.05 to R, and repeating S203 to S208 till R is equal to 1, or $p_1$ is smaller than 0; and S210, drawing the chart of water-sealed gas in the high-sulfur water-bearing gas reservoir according to R and corresponding $\varphi$.

Figure 3:
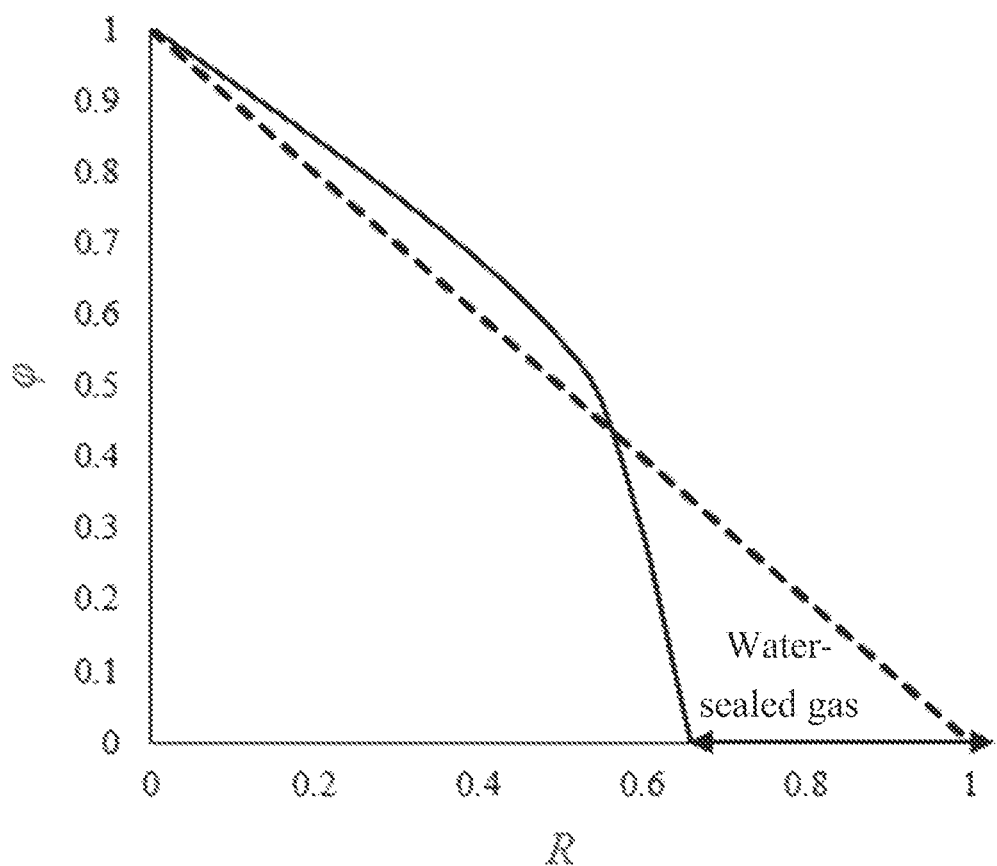
FIG. 3 is a schematic diagram illustrating calculation of the amount of water-sealed gas in Block A.

S300, calculate the amount of the water-sealed gas in the high-sulfur water-bearing gas reservoir, which specifically includes:

S301, taking R corresponding to $\varphi=0$ as a recovery factor EUR of the high-sulfur water-bearing gas reservoir in consideration of water-sealed gas and water-soluble gas, where EUR=0.63; and S302, setting $G_B=(1-\text{EUR})\times G$, as shown in FIG. 3;

where G denotes dynamic reserves, in unit of $10^8$ m$^3$; $G_B$ denotes an amount of water-sealed gas, in unit of $10^8$ m$^3$; and EUR denotes a dimensionless recovery ration when $\varphi=0$.

It can be calculated that the well A of gas field A has the amount of water-sealed gas of $0.4699\times10^8$ m$^3$.

Further, according to the method for predicting an amount of water-sealed gas in a high-sulfur water-bearing gas reservoir, the solubility of hydrogen sulfide is measured by an experiment or calculated by an empirical equation.

Compared with the prior art, the present disclosure has the following beneficial effects: (1) the method for predicting an amount of water-sealed gas in a high-sulfur water-bearing gas reservoir is established, which is suitable for the high-sulfur water-bearing gas reservoir; (2) calculation is conducted using the iterative method, thereby ensuring high precision; (3) the chart is drawn by programming, and the calculation process is simple; and (4) the popularity is high.

Finally, it should be noted that the above embodiments are only intended to explain, rather than to limit the technical solutions of the present disclosure. Although the present disclosure is described in detail with reference to the above embodiments, those skilled in the art should understand that modifications or equivalent substitutions may be made to the technical solutions of the present disclosure without departing from the spirit and scope of the technical solutions of the present disclosure, and such modifications or equivalent substitutions should be included within the scope of the claims of the present disclosure.

What is claimed is:

1. A method for predicting an amount of water-sealed gas in a high-sulfur water-bearing gas reservoir, comprising the following steps:

S100, deriving a material balance equation of the high-sulfur water-bearing gas reservoir in consideration of water-sealed gas and water-soluble gas, which mainly comprises:

S101, establishing a physical model of the high-sulfur water-bearing gas reservoir in consideration of water-sealed gas and water-soluble gas;

S102, for a constant-volume gas reservoir in which a sum of a volume of initial gas and a volume of initial formation water is equal to a sum of a volume of remaining gas, an evolution volume of water soluble gas, a volume of irreducible water, a rock expansion volume, and a volume of remaining formation water, establishing the material balance equation; and S103, substituting each of the volume of remaining gas, the evolution volume of water soluble gas, the volume of irreducible water, the rock expansion volume, and the volume of remaining formation water in S102 into the material balance formula for representation, wherein the material balance equation of the high-sulfur water-bearing gas reservoir in consideration of water-sealed gas and water-soluble gas is given as follows:

$$\varphi = \frac{1-R-\delta R^F}{1+\beta+(\alpha-1)R^F},$$

wherein $\delta = \frac{K^+}{V^+K^+ +1}$, $\alpha = r_s B_g$, $r_s = \frac{8.314 Z_s \rho_w m_{H_2S} T}{p}$, $$\beta = \frac{B_g S_{wi}}{S_{gi}}\left(\frac{B_w}{B_{wi}}r_s - r_{si}\right) - \frac{(C_f+C_w S_{wi})(p_i-p)}{S_{gi}},$$

and $\delta$ denotes a reservoir heterogeneity coefficient; $\varphi$ denotes a dimensionless pseudopressure; R denotes a dimensionless recovery percent of a gas reservoir; F denotes a dimensionless water invasion constant; $K^+$ denotes a dimensionless permeability ratio; $V^+$ denotes a dimensionless volume ratio; $p_i$ denotes an initial formation pressure of the gas reservoir, in unit of MPa; p denotes a current formation pressure of the gas reservoir, in unit of MPa; $B_g$ denotes a dimensionless volume coefficient of natural gas under a pressure p; $S_{wi}$ denotes a dimensionless initial formation water saturation; $S_{gi}$ denotes a dimensionless initial gas saturation; $B_g$ denotes a dimensionless volume coefficient of formation water under a pressure p; $B_{wi}$ denotes a dimensionless volume coefficient of formation water under a pressure $p_i$; $r_s$ denotes a solution gas-water ratio of hydrogen sulfide under a pressure p, in unit of m$^3$/m$^3$; $r_{si}$ denotes a solution gas-water ratio of hydrogen sulfide under a pressure $p_i$, in unit of m$^3$/m$^3$; $C_f$ denotes a compressibility coefficient of rock, in unit of MPa$^{-1}$; $C_w$ denotes a compressibility coefficient of formation water, in unit of MPa$^{-1}$; $Z_s$ denotes a dimensionless deviation factor of hydrogen sulfide; $\rho_w$ denotes density of water, in unit of kg/m$^3$; $m_{H_2S}$ denotes solubility of hydrogen sulfide, in unit of mol/kg; and T denotes a temperature of the gas reservoir, in unit of K;

S200, drawing a chart of water-sealed gas in the high-sulfur water-bearing gas reservoir by conducting iterative operation in the material balance equation of the high-sulfur water-bearing gas reservoir in consideration of water-sealed gas and water-soluble gas; and S300, calculating the amount of the water-sealed gas in the high-sulfur water-bearing gas reservoir, which specifically comprises:

S301, taking R corresponding to $\varphi=0$ as a recovery factor EUR of the high-sulfur water-bearing gas reservoir in consideration of water-sealed gas and water-soluble gas; and S302, setting $G_B=(1-\text{EUR})\times G$; wherein G denotes dynamic reserves, in unit of $10^8$ m$^3$, and $G_B$ denotes an amount of water-sealed gas, in unit of $10^8$ m$^3$.

2. The method for predicting an amount of water-sealed gas in a high-sulfur water-bearing gas reservoir according to claim 1, wherein S200 specifically comprises the following substeps:

S201, setting $p_o=p_i$;

S202, assigning 0 as an initial value to R;

S203, substituting $p_o$ into a calculation equation of $\beta$ and $\alpha$ to obtain $\beta$ and $\alpha$, and substituting the obtained $\beta$ and $\alpha$, the reservoir heterogeneity coefficient $\delta$, and water invasion constant F into the material balance equation of the high-sulfur water-bearing gas reservoir in consideration of water-sealed gas and water-soluble gas to calculate $\varphi$;

S204, calculating the pressure $p_1$ according to $\varphi$, and substituting $p_1$ into the calculation equation of $\beta$ and $\alpha$ to obtain $\beta_1$ and $\alpha_1$;

S205, substituting $\beta_1$ and $\alpha_1$ obtained from $p_1$, as well as given $\delta$ into the material balance equation of the high-sulfur water-bearing gas reservoir in consideration of water-sealed gas and water-soluble gas to calculate $\varphi_1$;

S206, calculating $p_2$ according to $\varphi_1$ and making $p_2$ equal to $p_o$;

S207, repeating S203 to S206 till $p_2-p_1<0.0001$;

S208, outputting $\varphi$ at this moment;

S209, adding 0.05 to R, and repeating S203 to S208 till R is equal to 1, or $p_1$ is smaller than 0; and S210, drawing the chart of water-sealed gas in the high-sulfur water-bearing gas reservoir according to R and corresponding $\varphi$.

3. The method for predicting an amount of water-sealed gas in a high-sulfur water-bearing gas reservoir according to claim 1, wherein solubility of hydrogen sulfide is measured by an experiment or calculated by an empirical equation.

* * * * *